United States Patent [19]
Zeitler et al.

[11] Patent Number: 4,526,952
[45] Date of Patent: Jul. 2, 1985

[54] ANTISTATIC OR ELECTRICALLY CONDUCTIVE THERMOPLASTIC POLYURETHANES: PROCESS FOR THEIR PREPARATION AND THEIR USE

[75] Inventors: Gerhard Zeitler, Hessheim; Gerhard Bittner; Knud Faehndrich, both of Diepholz; Hans M. Rombrecht, Quernheim, all of Fed. Rep. of Germany

[73] Assignee: BASF Aktiengesellschaft, Ludwigshafen, Fed. Rep. of Germany

[21] Appl. No.: 620,430

[22] Filed: Jun. 14, 1984

[30] Foreign Application Priority Data

Jun. 15, 1983 [DE] Fed. Rep. of Germany ....... 3321516

[51] Int. Cl.$^3$ ............................................... C08K 3/04
[52] U.S. Cl. .................................... 524/496; 524/495; 524/589; 524/590; 524/910; 252/511
[58] Field of Search ............... 524/589, 590, 495, 496, 524/910; 252/511

[56] References Cited

U.S. PATENT DOCUMENTS 3,673,121 6/1972 Meyer ................................. 252/511
3,830,656 8/1974 Takenaka et al. ................... 252/511
4,097,656 6/1978 Dany et al. ......................... 524/910

Primary Examiner—Lewis T. Jacobs
Attorney, Agent, or Firm—William G. Conger; Joseph D. Michaels

[57] ABSTRACT

Antistatic and/or electrically conductive thermoplastic polyurethanes contain carbon black whose surface area determined by the BET method is from 600 to 1200 m$^2$/g, have a dibutylphthalate absorption number of 300 to 450 cm$^3$/100 g, a pour density of less than 250 kg/m$^3$, and an average particle size less than 50 nm.

Incorporation of the carbon black into the thermoplastic polyurethane produced by the continuous sheet method takes place at temperatures under the primary melt peak for the crystalline rigid segments, measured by means of differential calorimetry, preferably in an extruder.

The products are suitable for preparing films for flat heating elements, antistatic hoses, cables, and profiles.

8 Claims, No Drawings

ANTISTATIC OR ELECTRICALLY CONDUCTIVE THERMOPLASTIC POLYURETHANES: PROCESS FOR THEIR PREPARATION AND THEIR USE

BACKGROUND OF THE INVENTION

1. Field of the Invention

The present invention relates to antistatic or electrically conductive thermoplastic polyurethanes and a process for making them. More particularly, the invention relates to the preparation of these thermoplastic polyurethanes by incorporation of carbon black having specific physical characteristics into a thermoplastic polyurethane while maintaining the temperature below the melting point peak of the rigid crystalline segments as determined by differential scanning calorimetry.

2. Description of the Prior Art

Thermoplastic polyurethane elastomers have been known for a long time. Their commercial utility is based on their ability to combine desirable mechanical properties with the advantages of economic thermoplastic processing. A wide range of mechanical properties can be achieved by using different starting materials. An overview of thermoplastic polyurethane elastomers, their properties and applications, is given in Kunststoffe 68 (1978), pp. 819–825, or in Kautschuk, Gummi, Kunststoffe 35 (1982), pp. 568–584.

Thermoplastic polyurethane elastomers can be produced either continuously or by batch processes. The most well known of the continuous processes, the so-called sheet process and the extrusion process, are widely used on a commercial scale.

In British Pat. No. 1,057,018, for example, a polymer is prepared from an essentially linear hydroxyl compound and excess organic diisocyanate, fed into a mixing head through a metering pump, and mixed therein with a specified amount of a low-molecular-weight diol. The resulting reaction mixture is fed onto a conveyor belt and passed through an oven heated to from 70° to 130° C. until it solidifies. The reaction product is then granulated and tempered at temperatures up to 120° C. for from 6 to 40 hours. The resulting product can then be processed into molded parts by the usual methods, for example, by injection molding.

In the extrusion process, which is described in German Pat. No. 20 59 570 (U.S. Pat. No. 3,642,964), the starting components are fed directly into the extruder and the reaction is performed in the extruder under the specified process conditions. The resulting polyurethane elastomer is converted into a thermoplastic directly, extruded as a strand, cooled in an inert gas atmosphere until it solidifies, and is then granulated. The disadvantage of this process is that the resulting thermoplastic polyurethane elastomer is not suitable for producing sheets, fine sections, and tubing or hose. Thermoplastic polyurethane elastomers of identical composition are transparent when made by the extrusion process, but have an opaque appearance when made by the continuous sheet process. Opaque thermoplastic polyurethane elastomers can be processed into films which are not subject to blocking, while transparent thermoplastic polyurethane elastomers are not suitable for this purpose.

Polyurethane elastomers are frequently modified by incorporating suitable additives. In order to improve resistance to hydrolysis, ortho-substituted diarylcarbodiimides can be utilized in amounts of up to 2 weight percent of the total mixture. Polyurethane elastomers having low coefficients of friction are obtained when solid or liquid lubricants or mixtures thereof are blended with the elastomers. Suitable lubricants, for example, are graphite or molybdenum disulfide, which are generally mixed with paraffin or silicone oil. A maximum of 3 weight percent of such lubricants is generally added, since greater amounts do not increase the lubricating effect but do decrease mechanical properties. Improved antistatic properties can be obtained by adding conductive pigment carbon blacks or antistatic plasticizers. However, since pigment carbon blacks produce a large and undesired increase in viscosity, only a few percent can be used successfully.

Various types of fillers, similar to those used in rubber technology, can be incorporated into polyurethane elastomers in relatively large amounts. For example, increasingly greater reinforcing effects can be achieved by adding kaolin, precipitated silicic acid, and pyrogenically obtained silicic acid, respectively. Carbon black fillers can sometimes exhibit a higher level of mechanical properties than light colored fillers. Rollable polyurethane elastomers often incorporate from 60 to 100 weight parts of an inactive of semi-active filler for each 100 weight parts elastomer and from 20 to 60 weight parts of a highly active filler (*Kunststoff Handbuch*, vol. VII, Polyurethane, by R. Vieweg and A. Hochtlen. Munich: Carl Hanser Verlag, 1966, pp. 206 ff).

Polyurethane elastomers modified in this manner, however, only have slight conductivity. Moreover, there is a severe decrease in mechanical properties as well as increasing difficulty in processing these elastomers into molded parts.

SUMMARY OF THE INVENTION

The object of the subject invention is to prepare antistatic or electrically conductive thermoplastic polyurethane elastomers with good mechanical properties by means of an economical process. In particular, antistatic behavior and electrical conductivity may be significantly improved without a decrease in the level of mechanical properties.

This objective was unexpectedly met with the aid of a special, modified carbon black, coupled with the incorporation of this carbon black into thermoplastic polyurethane elastomers at temperatures below the melting point peak of the rigid crystalline segments as measured by means of differential scanning calorimetry (DSC).

Carbon blacks which are useful in the preparation of the antistatic or electrically conductive thermoplastic polyurethanes of the invention have the following physical characteristics:

1. a surface area measured according to the BET method of from 600 to 1200 $m^2/g$, preferably from 800 to 1000 $m^2/g$ (ASTM D-3037),
2. a dibutyl phthalate absorption number of from 300 to 450 $cm^3$, preferably from 350 to 420 $cm^3$ per 100 g carbon black (ASTM D-2414),
3. a pour density of less than 250 $kg/m^3$, preferably from 100 to 200 $kg/m^3$ (ASTM D-1513) and
4. an average particle size of less than 50 nm, preferably from 20 to 40 nm.

Carbon blacks which fulfill the characteristics specified for the invention are marketed, for example, under the trademark XE-2 by Phillips Petroleum Chemicals and as KETGENBLACK EC by Akzo Chemie.

The electrical conductivity of thermoplastic polyurethane elastomers can be significantly improved by incorporating carbon black meeting the above specifications. The electrical conductivity of the thermoplastic polyurethane elastomers increases with greater carbon black concentrations, while the electrical resistance decreases accordingly. The carbon black suitable for the invention is used in such amounts that the antistatic or electrically conductive thermoplastic polyurethanes contain from 2 to 35 weight percent carbon black, preferably from 3 to 25 weight percent, based on total weight. Amounts of carbon black from 3 to 7 weight percent are used to improve the antistatic properties of the polyurethane and amounts of from 10 to 25 weight percent are used to increase conductivity.

In order to incorporate the carbon black, the thermoplastic polyurethane elastomer is transformed into a plastic state by heating at temperatures of approximately 190° to 220° C. and, after the carbon black is added, is processed with the aid of conventional equipment familiar in the rubber industry. Suitable devices are, for example, kneaders and extruders. Double-shaft extruders are preferably used.

In order to prepare thermoplastic polyurethane elastomers having optimum antistatic characteristics or optimum electrical conductivity, the carbon black which is utilizable in accordance with the invention must be incorporated into the thermoplastic polyurethane elastomers using a special process. An essential characteristic of this process is the temperature at which the carbon black is incorporated. This temperature must be lower than the primary melting point of the crystalline rigid segments, as measured using differential scanning calorimetry, by at least 1° C., preferably from 3° to 8° C. The thermoplastic polyurethane elastomers throughput which is possible in the extruder depends upon the amount of carbon black to be incorporated. If more carbon black is to be incorporated, the throughput of the extruder must be decreased to maintain the temperature below the primary melting peak temperature. If the carbon black is incorporated at or above the temperature of the primary melting peak for the thermoplastic polyurethane elastomers, electrical conductivity is considerably reduced.

The antistatic or electrically conductive polyurethanes of the invention are produced from thermoplastic polyurethane elastomers manufactured by the continuous sheet process. These polyurethanes can be prepared, for example, from the reaction of organic diisocyanates, polyols, and chain extenders, in the presence of suitable catalysts, and optionally, auxiliaries or additives.

The organic diisocyanates which may be used to form thermoplastic polyurethane elastomers include, by way of example, aliphatic, cycloaliphatic, and, preferably, aromatic diisocyanates. Typical examples are: aliphatic diisocyanates such as hexamethylene diisocyanate, cycloaliphatic diisocyanates such as isophorone diisocyanate, 1,4-cyclohexane diisocyanate, 1-methyl-2,4- and 1-methyl-2,6-cyclohexane diisocyanate as well as corresponding isomer mixtures, 4,4'-, 2,4'-, and 2,2'-methylene bis(cyclohexylisocyanate) as well as the corresponding isomer mixtures, and preferably, aromatic diisocyanates such as 2,4-toluene diisocyanate, mixtures of 2,4- and 2,6-toluene diisocyanate, 4,4'-, 2,4'-, and 2,2'-diphenylmethane diisocyanate, mixtures of 2,4'- and 4,4'-diphenylmethane diisocyanate, urethane-modified liquid 4,4'- and/or 2,4'-diphenylmethane diisocyanates, 4,4'-diisocyanato-1,2-diphenylethane, and 1,5-naphthalene diisocyanate. Preferably, hexamethylene diisocyanate, isophorone diisocyanate, and diphenylmethane diisocyanate isomer mixtures having a 4,4'-diphenylmethane diisocyanate content greater than 96 weight percent are used with 4,4'-diphenylmethane diisocyanate and 1,5-naphthalene diisocyanate being especially preferred.

Polyether polyols and, in particular, polyester polyols are preferred as the polyol component. Such polyols having molecular weights from 500 to 8000 are especially preferred. However, other hydroxyl-group-containing polymers, for example polyacetals such as polyoxymethylenes; water insoluble formals such as polybutanediol and polyhexanediol formals; and polycarbonates, in particular those prepared by the transesterification of diphenylcarbonate and 1,6-hexanediol, and having the above molecular weights may also be used. However, the polyhydroxyl compounds must be primarily linear, in other words, they should be basically difunctional. The polyhydroxyl compounds cited can be utilized as individual components or as mixtures.

Suitable polyether polyols can be prepared by reacting one or more alkylene oxides having from 2 to 4 carbon atoms in the alkylene radical with an initiator molecule containing two active hydrogen atoms. Typical alkylene oxides are: ethylene oxide, 1,2-propylene oxide, epichlorohydrin, and 1,2- and 2,3-butylene oxide. Ethylene oxide and mixtures of 1,2-propylene oxide and ethylene oxide are preferably utilized. The alkylene oxides can be utilized individually, alternating one after another, or as mixtures. Typical initiator molecules are: water, amino alcohols such as N-alkyldiethanolamines, for example, N-methyldiethanolamine; and diols such as ethylene glycol, 1,3-propylene glycol, 1,4-butanediol, and 1,6-hexane diol. When appropriate, mixtures of initiators can also be utilized. Suitable polyether polyols also include hydroxyl-group-containing polymerization products of tetrahydrofuran.

Preferably utilized are hydroxyl-group-containing polytetrahydrofuran and polyether polyols of 1,2-propylene oxide and ethylene oxide in which more than 50 percent, preferably from 60 to 80 percent, of the hydroxyl groups are primary hydroxyl groups, and in which at least part of the ethylene oxide is a block in terminal position.

Such polyether polyols can be obtained, for example, by first polymerizing 1,2-propylene oxide onto a difunctional initiator, followed by addition polymerization of ethylene oxide; or by first copolymerizing 1,2-propylene oxide in a mixture with ethylene oxide followed by polymerization of ethylene oxide alone. Optionally, a step-by-step sequence can be followed in which part of the ethylene oxide is polymerized onto the initiator, then all the 1,2-propylene oxide, and finally the remainder of the ethylene oxide.

The predominately linear polyether polyols have molecular weights from 500 to 8000, preferably from 600 to 6000, and more preferably from 800 to 3500. They can be used individually or together with each other as mixtures.

Suitable polyester polyols can be prepared, for example, from dicarboxylic acids having from 2 to 12 carbon atoms, preferably from 4 to 6 carbon atoms, with divalent alcohols. Typical dicarboxylic acids are: aliphatic dicarboxylic acids such as succinic acid, glutaric acid, adipic acid, suberic acid, azelaic acid, and sebacic acid, and aromatic dicarboxylic acids such as phthalic acid, isophthalic acid, and terephthalic acid. The carboxylic acids can be utilized individually or in the form of mixtures, for example, a mixture of succinic, glutaric, and adipic acid. In order to prepare the polyester polyols, it may sometimes be advantageous to utilize the corresponding carboxylic acid derivatives instead of the carboxylic acids themselves. Such derivatives might be carboxylic acid esters having from 1 to 4 carbon atoms in the alcohol radical, carboxylic acid anhydrides, or carboxylic acid chlorides.

Typical examples of divalent alcohols are glycols having from 2 to 10 carbon atoms, preferably from 2 to 6 carbon atoms, such as ethylene glycol, diethylene glycol, 1,4-butanediol, 1,5-pentanediol, 1,6-hexanediol, 1,10-decanediol, 2,2-dimethylpropane-1,3-diol, 1,3-propanediol, and dipropylene glycol. Depending on the desired characteristics, the divalent alcohols can be used individually or, when appropriate, as mixtures.

Also suitable are esters of the carbonic acids with the diols cited, in particular those diols having from 4 to 6 carbon atoms, and condensation products of ω-hydroxy-carboxylic acids, for example, ω-hydroxycaproic acid; and preferably, polymerization products of lactones, for example, substituted ω-caprolactones.

Preferably used polyester polyols are those prepared from: ethanediol and adipic acid; 1,4-butanediol and adipic acid; ethanediol, 1,4-butanediol, and adipic acid; 1,6-hexanediol, neopentylglycol, and adipic acid; 1,6-hexanediol, 1,4-butanediol, and adipic acid; and polycaprolactones. The polyester polyols have molecular weights ranging from 500 to 6000, preferably from 800 to 3500.

Preferable chain extenders having molecular weights from 60 to 400, more preferably from 60 to 300, are aliphatic diols having from 2 to 12 carbon atoms, preferably 2, 4, or 6 carbon atoms, such as ethanediol, 1,6-hexanediol, diethylene glycol, dipropylene glycol, and, preferably, 1,4-butanediol. However, diesters of terephthalic acid with glycols having from 2 to 4 carbon atoms are also suitable, for example, terephthalic acid bis-ethylene glycol or bis-1,4-butanediol, hydroxyalkyl ethers of hydroquinone such as 1,4-bis(2-hydroxyethyl)hydroquinone, cycloaliphatic diamines, such as isophorone diamine, ethylene diamine, 1,2-, and 1,3-propylene diamine, N-methyl-1,3-propylene diamine, N,N'-dimethyl ethylene diamine, and aromatic diamines such as 2,4- and 2,6-toluenediamine, 3,5-diethyl-2,4- and -2,6-toluenediamine, and ortho-, di-, tri-, and tetraalkyl-substituted 4,4'-diaminodiphenylmethanes.

In order to adjust the hardness and melting point of the thermoplastic polyurethane elastomers, the amount of polyol component and chain extender can be varied across relatively wide molar ranges. Molar ratios of the polyol to chain extender of from 1:1 to 1:12, preferably from 1:1.8 to 1:6.4, have proven successful. The hardness and melting point of the thermoplastic polyurethane elastomers increases with higher proportion of chain extender.

In order to produce the thermoplastic polyurethane elastomers, the diisocyanates, polyols, and chain extenders are reacted in the presence of catalysts, and in some cases, auxiliaries or additives, in such amounts that the equivalent ratio of isocyanate groups in the diisocyanate to the sum of the hydroxyl groups or the hydroxyl and amino groups in the polyol and chain extender components is from 1:0.85 to 1:1.2, preferably from 1:0.95 to 1:1.05, and most preferably, approximately 1:1.02.

Suitable catalysts for accelerating the reaction between the isocyanate groups in the diisocyanates and the hydroxyl group in the polyol and chain extender components are conventional tertiary amines known in the prior art such as triethylamine, dimethylcyclohexylamine, N-methylmorpholine, N,N'-dimethylpiperazine, 2-(dimethylaminoethoxy)-ethanol, diazabicyclo-[2.2.2]-octane. Organic metal compounds such as esters of titanic acid; iron compounds; tin compounds, for example tin diacetate, tin dioctoate, tin dilaurate, or the tin dialkyl salts of aliphatic carboxylic acids such as dibutyl tin diacetate, dibutyl tin dilaurate, are also useful as catalysts. The catalysts are typically used in amounts from 0.001 to 0.1 parts per 100 parts polyhydroxyl components.

In addition to the catalysts, the starting components may also include auxiliaries or additives, such as lubricants; inhibitors; stabilizers against hydrolysis, light, heat, or discoloration; flame retardants; dyes; pigments; inorganic and organic fillers; reinforcing agents; and plasticizers.

Further details on the above auxiliaries and additives are found in the technical literature, for example the monograph by J. H. Saunders and K. C. Frisch, *High Polymers*, vol. XVI, Polyurethane, pts. 1 and 2, Verlag Interscience Publishers, 1962/1964, or in German Pat. No. DE 29 01 774.

The preparation of the thermoplastic polyurethane elastomers in the continuous sheet process is performed by continuously mixing the starting materials with the aid of a mixing head, at temperatures above the melting point of the diisocyanates, polyol, and chain extender. The reaction mixture is fed onto a carrier, preferably a conveyor belt, and directed through a temperature-controlled zone. The reaction temperature in the temperature-controlled zone is from 60° to 200° C., preferably from 100° to 180° C., and the residence time is from 0.05 to 0.5 hour, preferably from 0.1 to 0.3 hour.

After completion of the reaction, the thermoplastic polyurethane elastomer which has a hardness of from Shore A 60 to Shore D 70, preferably from Shore A 60 to Shore A 98, and depending on the starting components, has a primary melting peak at from 212° to 216° C. at Shore A 85 and 220° to 225° C. at Shore A 98, is allowed to cool, diced or granulated, stored, or used directly with the carbon black which can be utilized in accordance with the invention.

To prepare the antistatic or conductive thermoplastic polyurethanes of the subject invention, the diced or granulated thermoplastic polyurethane elastomer is powdered or mixed with the carbon black and worked in a kneader for from 0.05 to 0.2 hour, preferably from 0.08 to 0.12 hour, in a plastic condition, or preferably in an extruder, most preferably a double screw extruder in a molten state. Extruder residence times range from 0.5 to 15 minutes, preferably 1 to 6 minutes, at temperatures from 190° to 220° C., preferably from 207° to 217° C., with the requirement that the selected processing temperature be below the primary melting peak of the crystalline rigid segments as measured by means of differential scanning calorimetry. When leaving the extruder, the finished thermoplastic polyurethane elastomer containing the carbon black usable in accordance with the invention is directly processed into a granulate in an inert gas atmosphere (nitrogen, for example), by means of hot face cutting.

The thermoplastic polyurethane elastomers of the invention have very good antistatic characteristics or high electrical conductivity depending upon the amount of carbon black added in addition to having good mechanical properties.

The thermoplastic polyurethane elastomers having a low carbon black content, for example up to approximately 7 weight percent, are preferably used to produce hoses, sections, or cables which must have antistatic characteristics, for example hoses used to transport combustible solvents, or for electrical cables used in mining. Products with higher carbon black contents and therefore greater electrical conductivity can be processed into films suitable for producing flat heating elements and which, for example at thicknesses of from 1 to 2 mm, produce heating outputs of approximately 100 to 200 watts/m².

It is also desirable, when processing the thermoplastic polyurethane elastomers of the invention into molded parts, to select processing temperatures such that the primary melting peak of the crystalline rigid segments is not reached or exceeded.

EXAMPLES 1-4—COMPARISON EXAMPLE A

A thermoplastic polyurethane elastomer prepared using the continuous sheet process at a temperature of 140° C. from a 1,4-butanediol/adipic acid polyester having a molecular weight of 2000, 4,4'-diphenylmethane diisocyanate, and 1,4-butanediol, and having a hardness of Shore A 80, a primary melting peak determined through DSC of 210° C., and a melt viscosity corresponding to a melt flow index (MFI) at 190° C. of 12 with a 21.6 kp weight; and carbon black having an average particle size of 30 nm, a bulk density of 150 g/l, a surface area of approximately 800 m²/g, a dibutylphthalate adsorption number of 400 cm³/100 g, and a pour density of 180 kg/m³ (XE carbon black from Phillips Petroleum Chemicals); were melted and mixed in a Werner und Pfleiderer double screw extruder and extruded through a die to form spaghetti, which were diced into granulate in the usual manner after cooling. The amount of thermoplastic polyurethane elastomer and carbon black fed into the extruder (throughput) and the speed of the extruder screw were controlled in such a way that the temperature of the compound before reaching the die does not exceed 280° C.

When relatively large amounts of carbon black were used, the throughput was adjusted as necessary to maintain a maximum compounding temperature of 208° C.

The granulate containing the carbon black was pressed into test plaques at 200° C. and the following mechanical properties were tested using the plaques:

|  | Examples | | | | Comparison Example |
|---|---|---|---|---|---|
|  | 1 | 2 | 3 | 4 | A |
| Carbon black content (weight percent, based on total weight) | 7 | 10 | 14 | 20 | — |
| Specific resistance per DIN 53 482 (Ohm · m) | 1.4 | 0.2 | 0.03 | 0.01 | $10^9$ |
| Tensile strength per DIN 53 504 (N/mm²) | 40 | 38 | 32 | 20 | 41 |
| Modulus of elasticity per DIN 53 457 (N/mm²) | 20 | 28 | 35 | 43 | 12 |
| Wear per DIN 53 516 (mm³) | 45 | 50 | 55 | 85 | 45 |

COMPARISON EXAMPLES B AND C

The procedure used was similar to that in Examples 1 and 3, however, the compounding temperature was increased to or above 212° C. by means of increasing the throughput or increasing the temperature, so that test plaques with the following mechanical properties were obtained:

| Comparison Examples | B | C |
|---|---|---|
| Carbon black content (weight percent based on total weight) | 7 | 14 |
| Specific resistance per DIN 53 482 Ohm · m | $6 \cdot 10^4$ | >1 |
| Tensile strength per DIN 53 504 (N/mm²) | 21 | 15 |

EXAMPLE 5

Ninety parts by weight of a thermoplastic polyurethane elastomer prepared by the continuous sheet process at a temperature of 155° C. from a polytetramethylene etherglycol having a molecular weight of 1000, 4,4'-diphenylmethane diisocyanate, and 1,4-butanediol, and having a Shore A hardness of 85, a primary melt peak of 216 determined of DSC and a melt viscosity corresponding to an MFI at 190° C. with a weight of 21.6 kp; and 10 parts by weight of carbon black XE supplied by Phillips Petroleum Chemicals were compounded under similar conditions as in Examples 1-4, so that the compounding temperature did not exceed 212° C.

The carbon black-containing granulate was compressed into test plaques, which exhibited a specific resistance in accordance with DIN 53 482 of 0.8 Ohm·m and a tensile strength in accordance with DIN 53 504 of 39 N/mm².

COMPARISON EXAMPLE D

The procedure used in Example 5 was followed, however, the thermoplastic polyurethane elastomer-carbon black mixture was processed in a double screw extruder at a temperature greater than 216° C. The test plaques produced therefrom had a specific resistance in accordance with DIN 53 482 of $2 \cdot 10^2$ Ohm·m and a tensile strength in accordance with DIN 53 504 of 16 N/mm².

The embodiments of the invention in which an exclusive privilege or property is claimed are defined as follows:

1. A process for the manufacture of antistatic or electrically conductive thermoplastic polyurethanes comprising incorporating carbon black into a thermoplastic polyurethane in an amount of from 2 weight percent to 35 weight percent, based on the weight at the finished polurethane, at a temperature below the thermoplastic polyurethane rigid crystalline segment melting point peak, wherein said carbon black is characterized by
   (1) a surface area of from 600 m²/g to 1200 m²/g;
   (2) a dibutyl phthalate absorption number of from 300 to 450 cm³ per 100 g of carbon black;
   (3) a pour density of less than 250 kg/m³; and
   (4) an average particle size of less than 50 nm.
2. The process of claim 1 wherein said thermoplastic polyurethane comprises the catalyzed addition polymerization product of an organic diisocyanate, a polyol having a molecular weight of from 500 to 8000, and a chain extender having a molecular weight of from 60 to 400.

3. The process of claim 1 wherein the thermoplastic polyurethane has a hardness of Shore A 60 to Shore D 70 before incorporation of carbon black.

4. The process of claim 2 wherein the thermoplastic polyurethane has a hardness of Shore A 60 to Shore D 70 before incorporation of carbon black.

5. The process of claim 2 wherein said organic diisocyanate is selected from the group consisting of 4,4'-diphenylmethane diisocyanate and 1,5-naphthalene diisocyanate.

6. The process of claim 2 wherein the polyol is selected from the group consisting of:
 (a) a polyester polyol condensation polymer of adipic acid and a 2 to 6 carbon diol;
 (b) polycaprolactone; and
 (c) polytetrahydrofuran.

7. The process of claim 1 wherein said carbon black is incorporated into said thermoplastic polyurethane by mixing in a twin screw extruder.

8. An antistatic or electrically conductive thermoplastic polyurethane prepared by the process of claim 1.

* * * * *